United States Patent
Nose

(10) Patent No.: US 7,561,787 B2
(45) Date of Patent: Jul. 14, 2009

(54) REDUCTION OPTICAL SYSTEM WITH A MENISCUS SINGLE-LENS ELEMENT

(75) Inventor: Hiromichi Nose, Toyokawa (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 517 days.

(21) Appl. No.: 11/241,131

(22) Filed: Sep. 30, 2005

(65) Prior Publication Data

US 2006/0291843 A1    Dec. 28, 2006

(30) Foreign Application Priority Data

Jun. 22, 2005    (JP) .............................. 2005-181551

(51) Int. Cl.
 *G02B 15/14* (2006.01)
 *G03B 17/00* (2006.01)
(52) U.S. Cl. ........................ 396/72; 359/684; 359/687
(58) Field of Classification Search .................... 396/72; 359/676, 687, 683, 684

See application file for complete search history.

(56) References Cited

U.S. PATENT DOCUMENTS

| 5,585,966 | A | * | 12/1996 | Suzuki | 359/557 |
| 5,654,826 | A | * | 8/1997 | Suzuki | 359/557 |
| 6,069,743 | A | * | 5/2000 | Nagata et al. | 359/687 |
| 2003/0117717 | A1 | * | 6/2003 | Ohtake et al. | 359/683 |

FOREIGN PATENT DOCUMENTS

| JP | 63-205626 A | 8/1988 |
| JP | 7-253537 A | 10/1995 |
| JP | 8-114742 A | 5/1996 |
| JP | 2000-121932 A | 4/2000 |

\* cited by examiner

*Primary Examiner*—Jay M Patidar
(74) *Attorney, Agent, or Firm*—Sidley Austin LLP

(57) ABSTRACT

A reduction optical system for forming, without re-imaging, a reduced image of a subject image formed by a main lens system. The reduction optical system has on the most object side a meniscus single-lens element convex to the object side, allowing for a high-performance, and compact reduction optical system by permitting lens replacement of the main lens system.

16 Claims, 11 Drawing Sheets

FNO=2.75

(W)
— d
----- SC

-0.5  0.5
SPHERICAL SINE
ABERRATION CONDITION

Y'=10.8

----- DM
— DS

-0.5  0.5
ASTIGMATISM

Y'=10.8

-5.0  5.0
DISTORTION %

FNO=3.31

(M)
— d
----- SC

-0.5  0.5
SPHERICAL SINE
ABERRATION CONDITION

Y'=10.8

----- DM
— DS

-0.5  0.5
ASTIGMATISM

Y'=10.8

-5.0  5.0
DISTORTION %

FNO=4.74

(T)
— d
----- SC

-0.5  0.5
SPHERICAL SINE
ABERRATION CONDITION

Y'=10.8

----- DM
— DS

-0.5  0.5
ASTIGMATISM

Y'=10.8

-5.0  5.0
DISTORTION %

FNO=2.75

(W)
— d
----- SC

SPHERICAL ABERRATION SINE CONDITION

Y'=10.8

----- DM
— DS

ASTIGMATISM

Y'=10.8

DISTORTION %

FNO=3.31

(M)
— d
----- SC

SPHERICAL ABERRATION SINE CONDITION

Y'=10.8

----- DM
— DS

ASTIGMATISM

Y'=10.8

DISTORTION %

FNO=4.74

(T)
— d
----- SC

SPHERICAL ABERRATION SINE CONDITION

Y'=10.8

----- DM
— DS

ASTIGMATISM

Y'=10.8

DISTORTION %

FNO=2.75

(W)
— d
--- SC

-0.5  0.5
SPHERICAL SINE
ABERRATION CONDITION

Y'=10.8

--- DM
— DS

-0.5  0.5
ASTIGMATISM

Y'=10.8

-5.0  5.0
DISTORTION %

FNO=3.31

(M)
— d
--- SC

-0.5  0.5
SPHERICAL SINE
ABERRATION CONDITION

Y'=10.8

--- DM
— DS

-0.5  0.5
ASTIGMATISM

Y'=10.8

-5.0  5.0
DISTORTION %

FNO=4.74

(T)
— d
--- SC

-0.5  0.5
SPHERICAL SINE
ABERRATION CONDITION

Y'=10.8

--- DM
— DS

-0.5  0.5
ASTIGMATISM

Y'=10.8

-5.0  5.0
DISTORTION %

FNO=2.75

(W)
— d
----- SC

-0.5　0.5
SPHERICAL SINE
ABERRATION CONDITION

Y'=10.8

----- DM
— DS

-0.5　0.5
ASTIGMATISM

Y'=10.8

-5.0　5.0
DISTORTION %

FNO=3.31

(M)
— d
----- SC

-0.5　0.5
SPHERICAL SINE
ABERRATION CONDITION

Y'=10.8

----- DM
— DS

-0.5　0.5
ASTIGMATISM

Y'=10.8

-5.0　5.0
DISTORTION %

FNO=4.74

(T)
— d
----- SC

-0.5　0.5
SPHERICAL SINE
ABERRATION CONDITION

Y'=10.8

----- DM
— DS

-0.5　0.5
ASTIGMATISM

Y'=10.8

-5.0　5.0
DISTORTION %

FNO=3.62

(W)

— d
--- SC

-0.5   0.5
SPHERICAL  SINE
ABERRATION CONDITION

Y'=14.2

---- DM
—— DS

-0.5   0.5
ASTIGMATISM

Y'=14.2

-5.0   5.0
DISTORTION %

FNO=4.36

(M)

— d
--- SC

-0.5   0.5
SPHERICAL  SINE
ABERRATION CONDITION

Y'=14.2

---- DM
—— DS

-0.5   0.5
ASTIGMATISM

Y'=14.2

-5.0   5.0
DISTORTION %

FNO=6.25

(T)

— d
--- SC

-0.5   0.5
SPHERICAL  SINE
ABERRATION CONDITION

Y'=14.2

---- DM
—— DS

-0.5   0.5
ASTIGMATISM

Y'=14.2

-5.0   5.0
DISTORTION %

REDUCTION OPTICAL SYSTEM WITH A MENISCUS SINGLE-LENS ELEMENT

This application is based on Japanese Patent Application No. 2005-181551 filed on Jun. 22, 2005, the contents of which are hereby incorporated by reference.

BACKGROUND OF THE INVENTION

1. Field of the Invention

The present invention relates to a reduction optical system. More particularly, the present invention relates to a reduction optical system for forming a reduced image of a subject image formed by a replaceable main lens system in, for example, a digital camera or a digital appliance equipped with an image capturing capability that capture an image of a subject with an image sensor, and to an image-taking apparatus provided therewith.

2. Description of Related Art

With the recent spread of personal computers, digital cameras that permit easy capturing of images are becoming increasingly widespread. Thus, with more and more widespread of digital cameras, various specifications have been demanded for a photographing optical system. Since a single-lens reflex camera that records an image on a silver salt film permits lens replacement, the demand described above can be satisfied by applying an interchangeable lens for a single-lens reflex camera to a digital camera. To achieve this, patent documents 1 through 3 each propose a photographing optical system that has a condenser lens arranged near the image surface of the interchangeable lens and that forms in a relay lens system a reduced image of an image formed by the interchangeable lens. Patent document 4 proposes a reduction optical system that achieves reduction without re-imaging an image formed by an interchangeable lens.

[Patent Document 1] Japanese Patent Application Laid-open No. S63-205626

[Patent Document 2] Japanese Patent Application Laid-open No. H7-253537

[Patent Document 3] Japanese Patent Application Laid-open No. H8-114742

[Patent Document 4] Japanese Patent Application Laid-open No. 2000-121932

However, the optical construction proposed in the patent documents 1 through 3 lead to upsizing of an entire photographing optical system due to the configuration such that an image formed by an interchangeable lens is re-imaged. In addition, the optical construction proposed in the patent document 4 suffers from difficulties in achieving satisfactory aberration correction in the added reduction optical system, because the aberration correction has been already completed in the interchangeable lens provided as the main lens system.

SUMMARY OF THE INVENTION

In view of such a situation, the present invention has been made, and it is an object of the invention to provide a high-performance, compact reduction optical system, and an image-taking apparatus provided therewith.

To achieve the object described above, according to one aspect of the invention, a reduction optical system for forming, without re-imaging, a reduced image of a subject image formed by a main lens system has on the most object side a meniscus single-lens element convex to the object side. The meniscus single-lens element fulfills conditional formula (1) below:

$$-0.2 < (R1-R2)/(R1+R2) < 0.3 \tag{1}$$

where R1 represents the radius of curvature of the object side surface of the meniscus single-lens element, and R2 represents the radius of curvature of the image side surface of the meniscus single-lens element.

According to another aspect of the invention, an image-taking apparatus has a reduction optical system for forming, without re-imaging, a reduced image of a subject image formed by a main lens system. The image taking apparatus permits attachment of the main lens system which is interchangeably fitted thereto. The reduction optical system has on the most object side a meniscus single-lens element convex to the object side. The meniscus single-lens element fulfills conditional formula (1) below:

$$-0.2 < (R1-R2)/(R1+R2) < 0.3 \tag{1}$$

where R1 represents the radius of curvature of the object side surface of the meniscus single-lens element, and R2 represents the radius of curvature of the image side surface of the meniscus single-lens element.

According to the present invention, the reduction optical system has on the most object side the meniscus single-lens element convex to the object side, and the meniscus single-lens element fulfills the predetermined condition, thereby achieving a high-performance, compact reduction optical system. Providing the reduction optical system according to the invention in the image-taking apparatus permits lens replacement of the main lens system. Thus, for example, an interchangeable lens for a silver salt single-lens camera can be applied to a digital camera. Moreover, an interchangeable lens having a format of a 135 system, the most prevailing system, can be used; therefore, an interchangeable lens having a new format is not required, thus permitting constructing a system of lens-replaceable digital camera at low cost.

DETAILED DESCRIPTION OF PREFERRED EMBODIMENTS

Hereinafter, reduction optical systems, photographing optical systems, image-taking apparatuses, and the like embodying the present invention will be described with reference to the accompanying drawings. Generally, a reduction optical system is an additional optical system whose lateral magnification ($\beta s = ys/ym$, where ym represents the maximum image height of a main lens system that has image forming action, and ys represents the maximum image height of a photographing optical system that has the main lens system and the additional optical system synthesized together) is smaller than 1 when arranged behind the main lens system. The use of only the main lens system for an image sensor having a small format results in a smaller angle of field. Adding the reduction optical system to the main lens system can provide, while using the image sensor having a small format, the same angle of field as provided before reduction (i.e., when only the main lens system is used). Thus, as is the case with the embodiments to be described later, the use of the reduction optical system that forms a reduced image of an image formed by the main lens system permits replacement of the main lens system; therefore, for example, an interchangeable lens for a silver salt single-lens reflex camera can be applied to a digital camera. In addition, a smaller reduction ratio results in a greater effective brightness. Thus, while using the image sensor having a small format, a wide angle lens for the silver salt single-lens reflex camera can be used as a substantially bright wide-angle lens for a digital camera.

Figure 1:
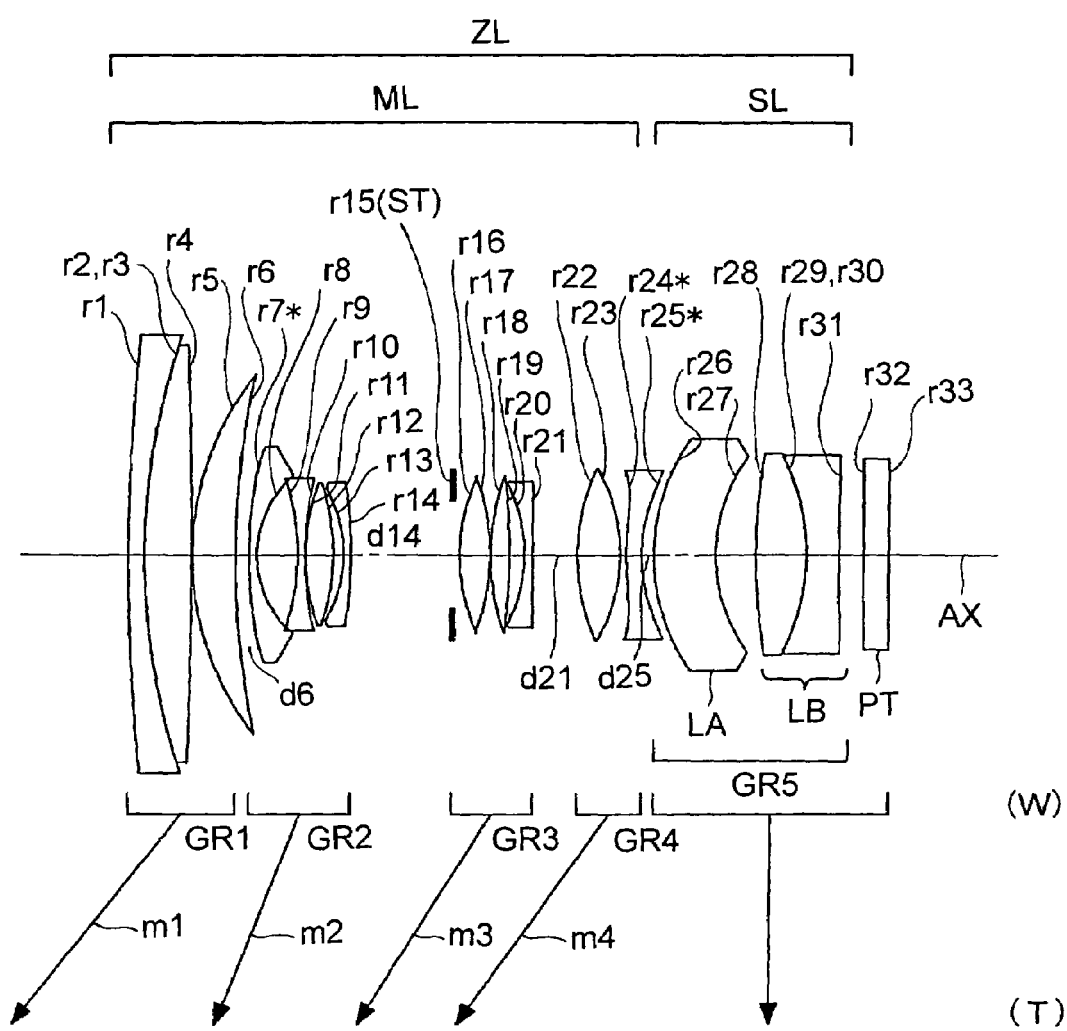
FIG. 1 is a diagram showing the lens construction of a first embodiment (Example 1) of the present invention.
Figure 2:
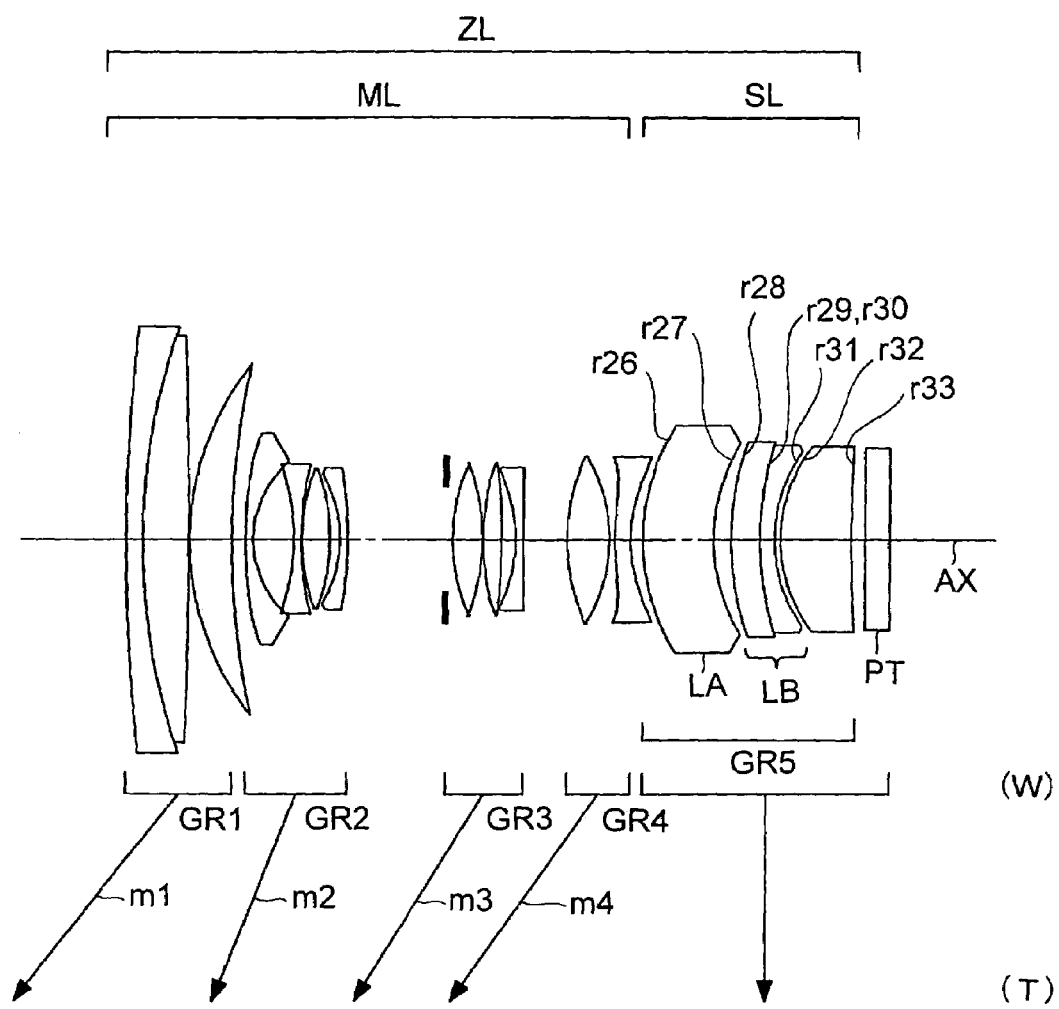
FIG. 2 is a diagram showing the lens construction of a second embodiment (Example 2) of the invention.
Figure 3:
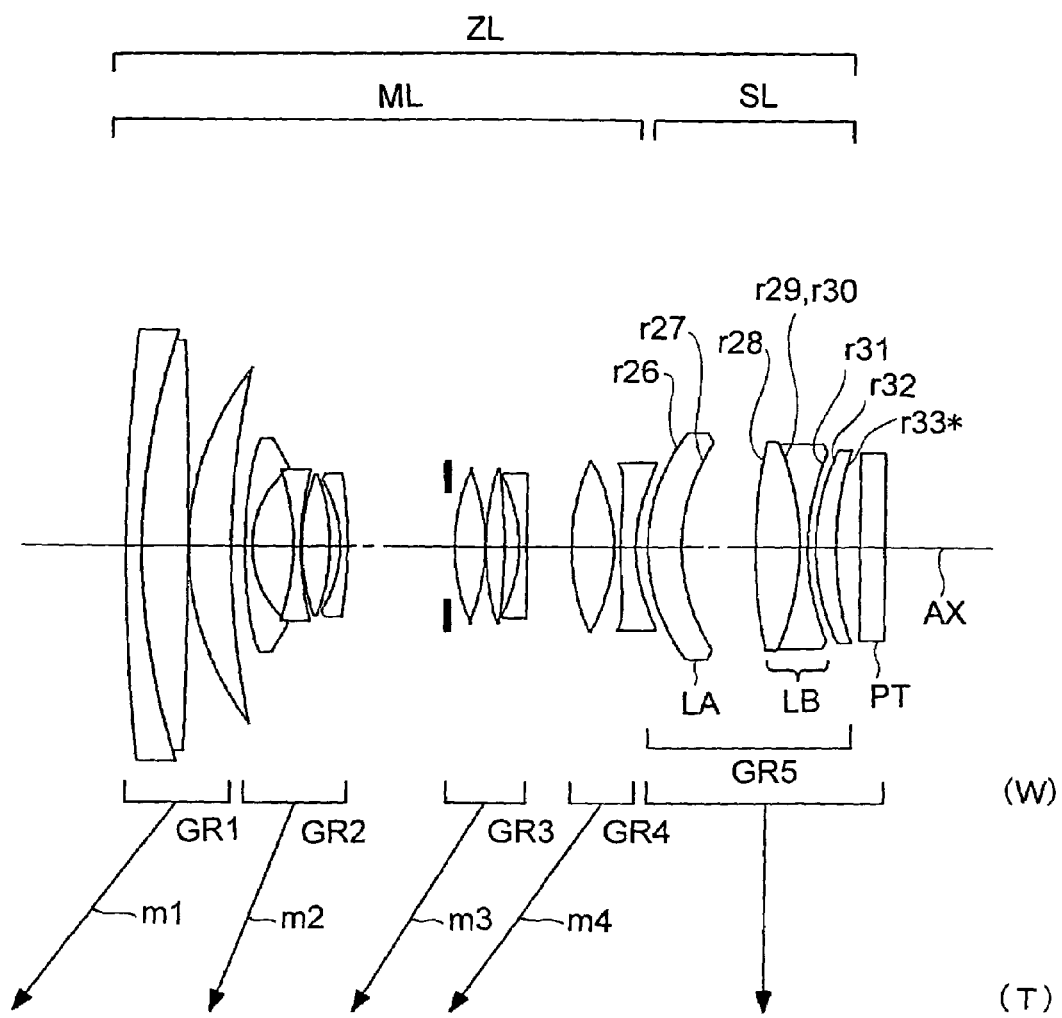
FIG. 3 is a diagram showing the lens construction of a third embodiment (Example 3) of the invention.
Figure 4:
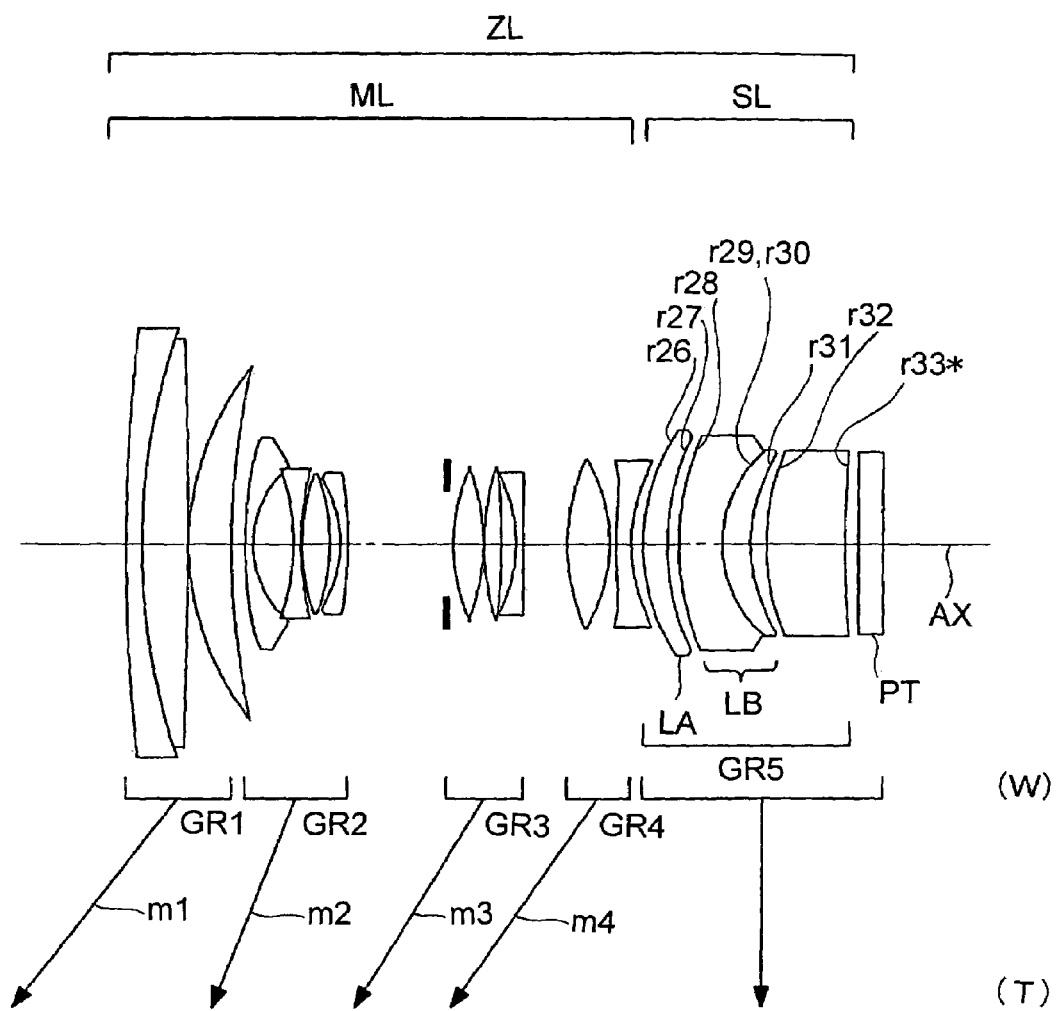
FIG. 4 is a diagram showing the lens construction of a fourth embodiment (Example 4) of the invention.
Figure 5A:
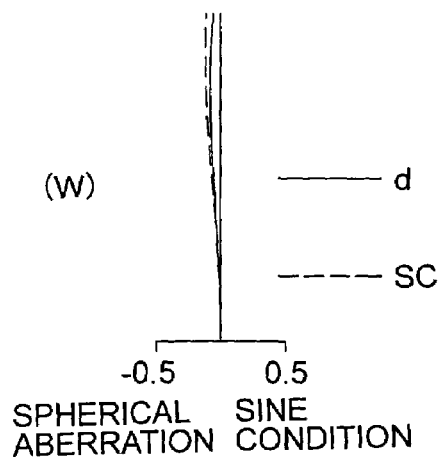
FIG. 5A to 5I are aberration diagrams of Example 1.
Figure 5B:
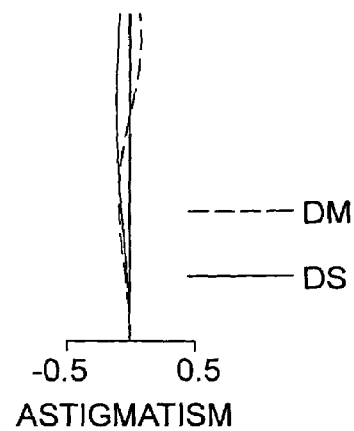
Figure 5C:
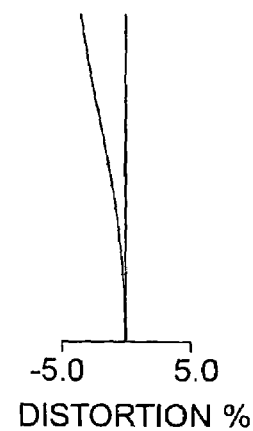
Figure 5D:
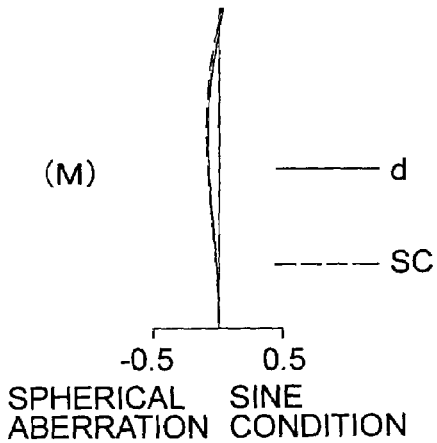
Figure 5E:
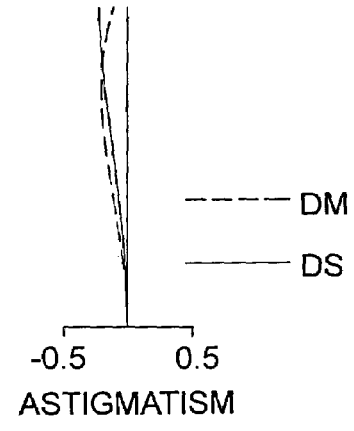
Figure 5F:
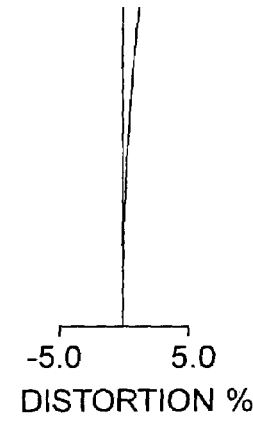
Figure 5G:
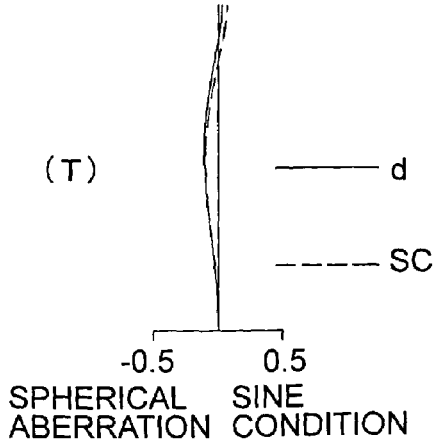
Figure 5H:
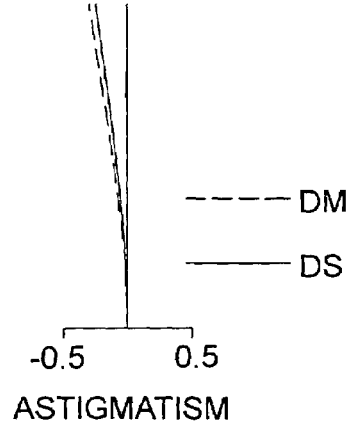
Figure 5I:
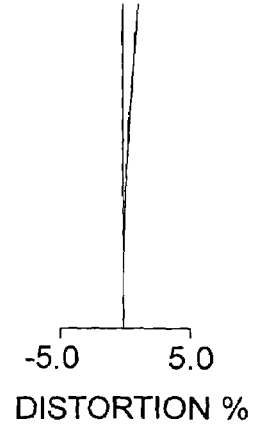
Figure 6A:
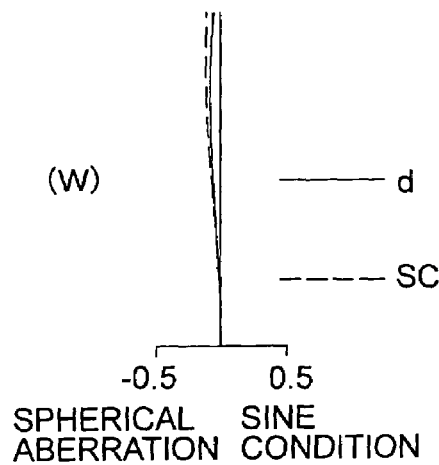
FIG. 6A to 6I are aberration diagrams of Example 2.
Figure 6B:
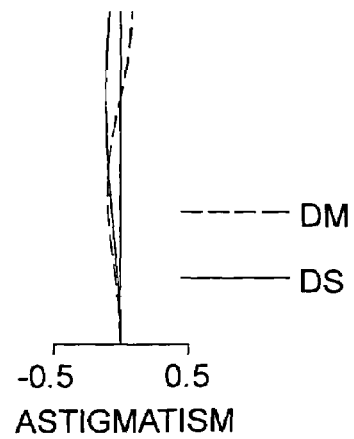
Figure 6C:
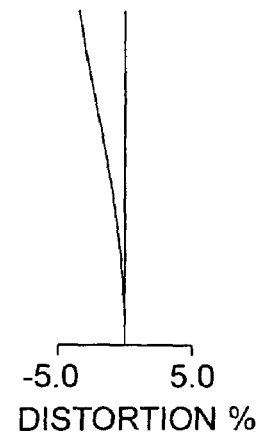
Figure 6D:
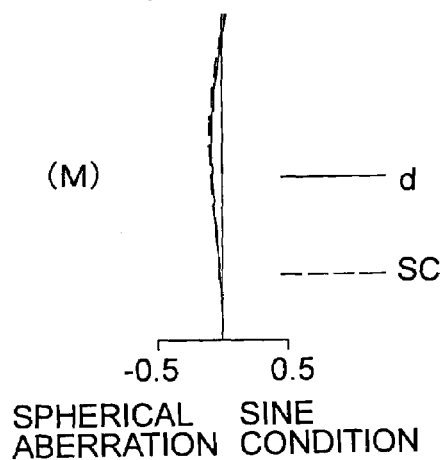
Figure 6E:
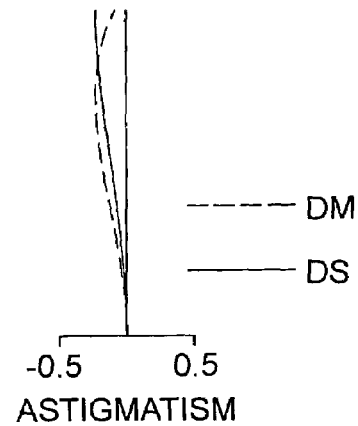
Figure 6F:
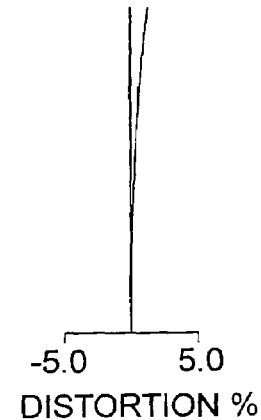
Figure 6G:
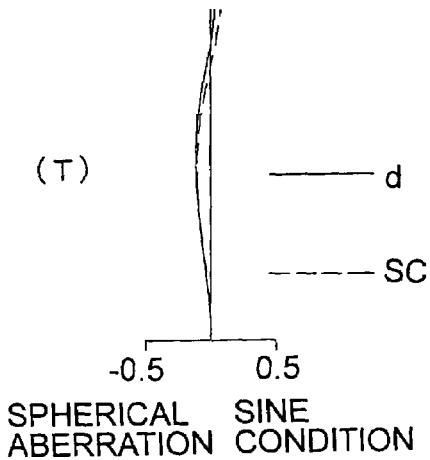
Figure 6H:
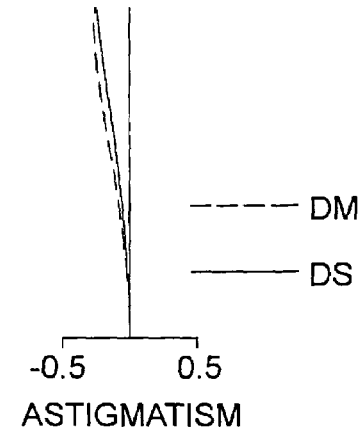
Figure 6I:
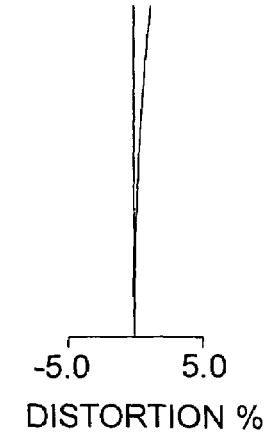
Figure 7A:
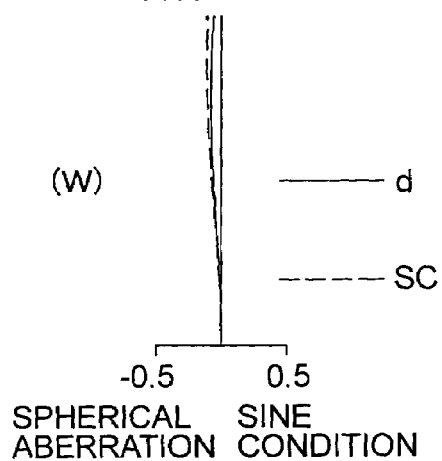
FIG. 7A to 7I are aberration diagrams of Example 3.
Figure 7B:
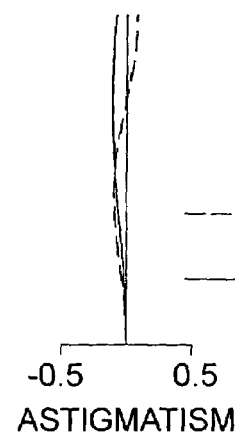
Figure 7C:
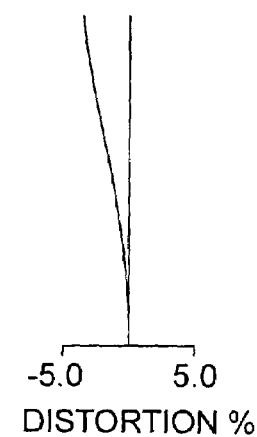
Figure 7D:
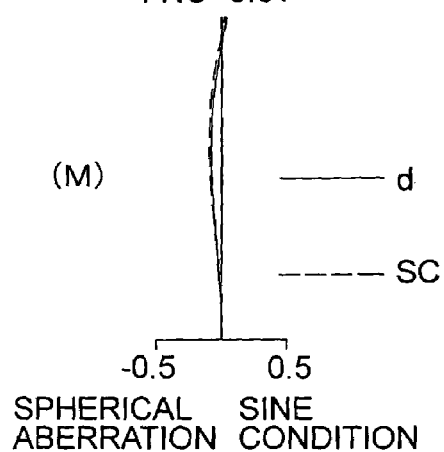
Figure 7E:
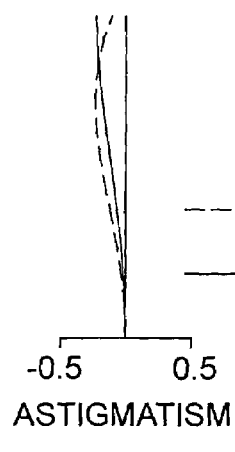
Figure 7F:
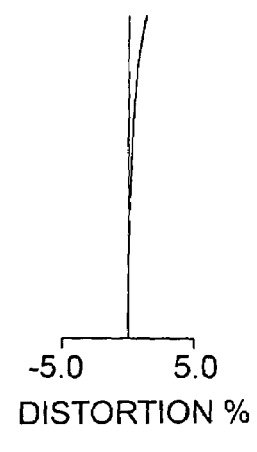
Figure 7G:
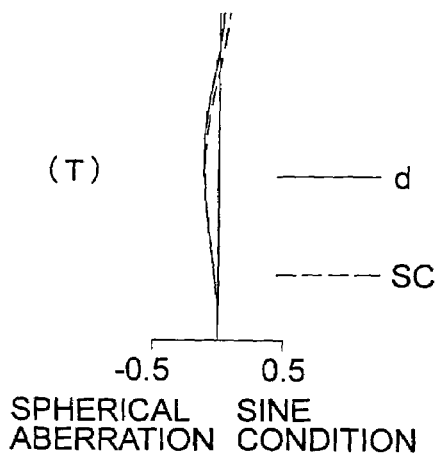
Figure 7H:
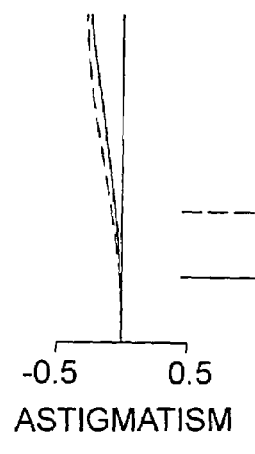
Figure 7I:
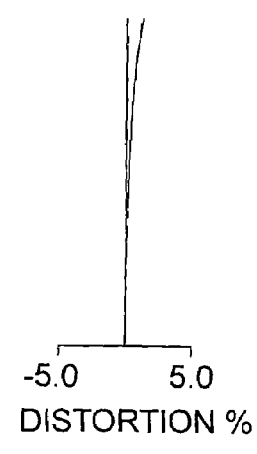
Figure 8A:
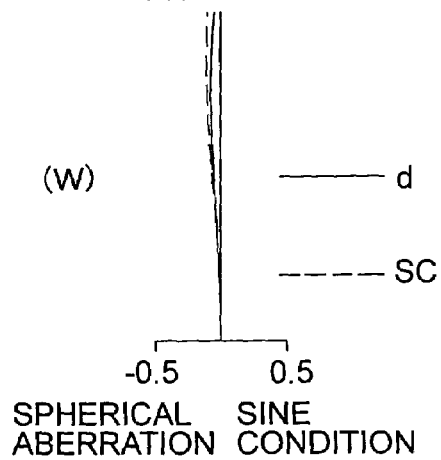
FIG. 8A to 8I are aberration diagrams of Example 4.
Figure 8B:
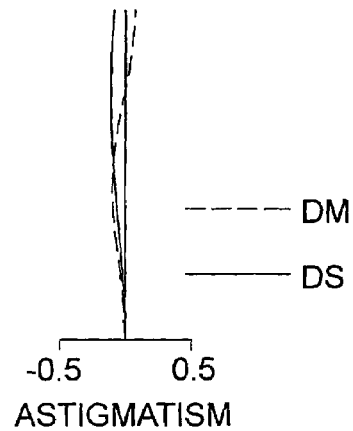
Figure 8C:
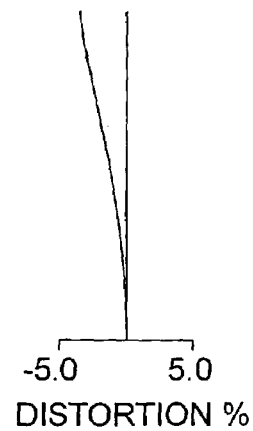
Figure 8D:
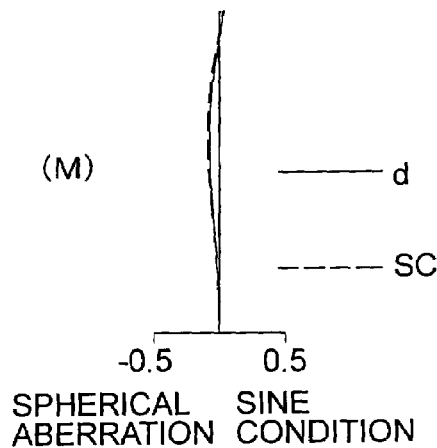
Figure 8E:
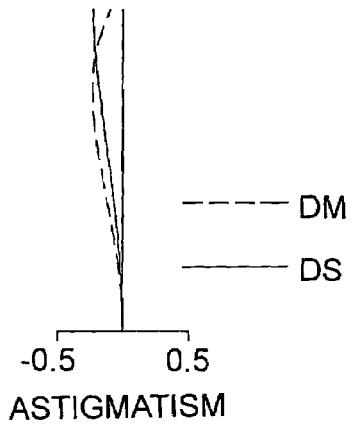
Figure 8F:
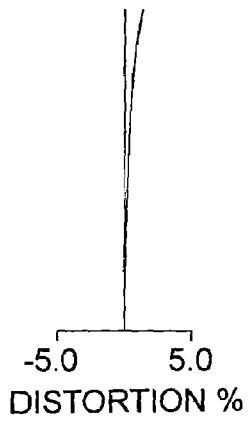
Figure 8G:
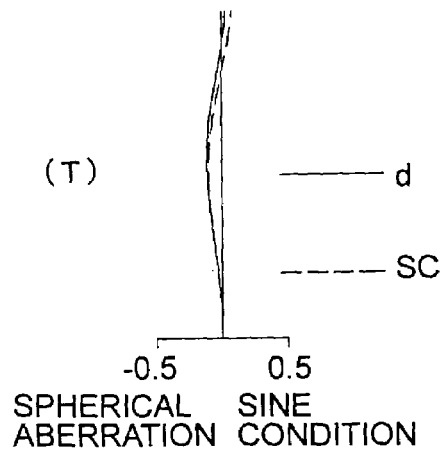
Figure 8H:
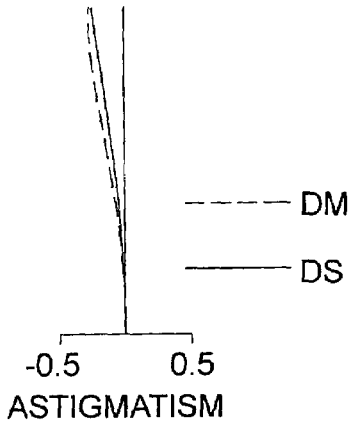
Figure 8I:
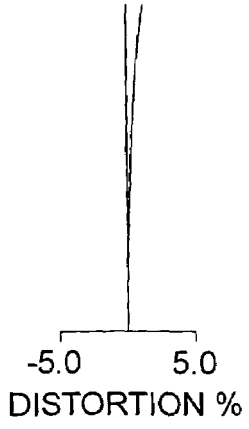
Figure 9:
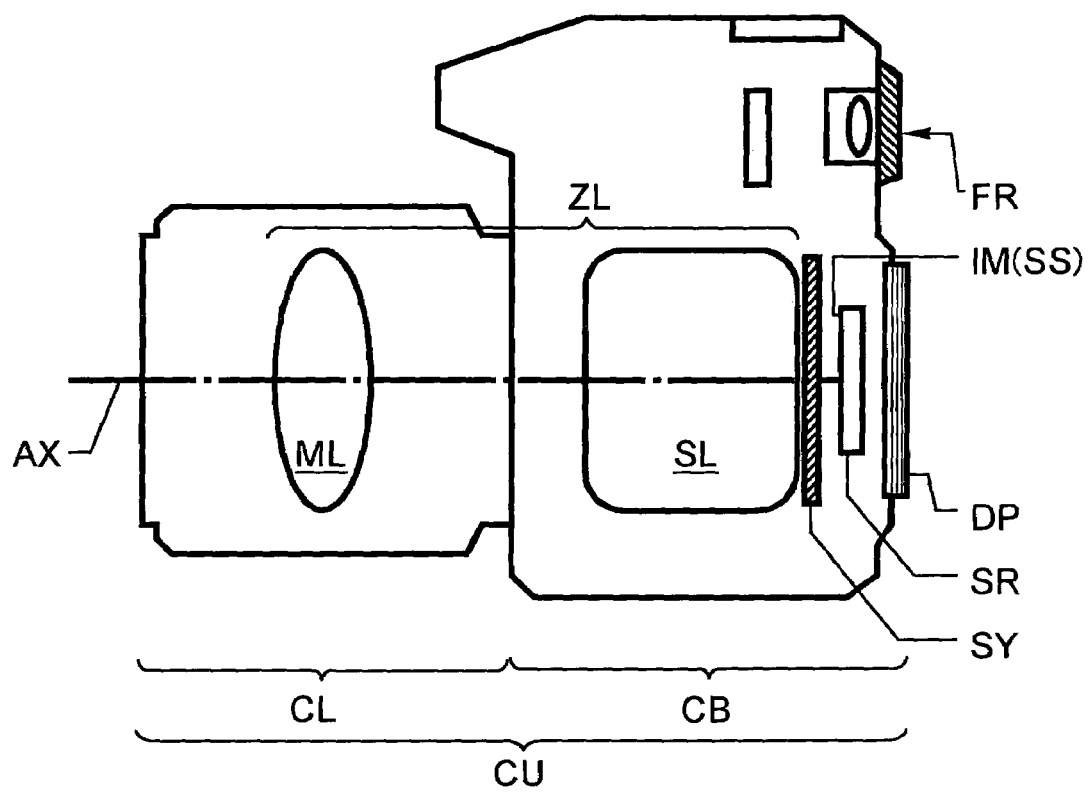
FIG. 9 is a schematic diagram showing an example of the optical construction of a camera incorporating an image-taking apparatus.

FIG. 9 is a schematic sectional diagram showing an example of the optical construction of a camera CU (equivalent to a digital camera, a digital appliance equipped with an image capturing capability, or the like) that is used for photographing a still image and a motion image of a subject. The camera CU includes a camera body CB and an interchangeable lens CL. The interchangeable lens CL is equivalent to an interchangeable lens for a silver salt single-lens reflex camera, and incorporates a main lens system ML that forms an image of a subject. The camera body CB is an image-taking apparatus which permits attachment of the main lens system ML that is to be interchangeably fitted. The camera body CB includes a reduction optical system SL, a shutter SY, an image sensor SR, an EVF finder FR, a display DP (e.g., LCD representing Liquid Crystal Display ), and the like.

The reduction optical system SL is an optical system that forms, without re-imaging, a reduced image of an image formed by the main lens system ML, and forms, in combination with the main lens system ML, a zoom lens system ZL (equivalent to a photographing optical system functioning as a variable magnification optical system) that variably forms a subject image (IM representing image surface). In the zoom lens system ZL composed of the main lens system ML and the reduction optical system SL, a plurality of lens units move along the optical axis AX, and variable magnification (that is, zooming) is performed by changing intervals between lens units. Used as the image sensor SR is a solid-state image sensor such as a CCD (charge-coupled device) or a CMOS (complementary metal-oxide-semiconductor) sensor having a plurality of pixels. An optical image formed by the zoom lens system ZL (on the light-receiving surface SS of the image sensor SR) is converted into an electrical signal by the image sensor SR. The signal produced by the image sensor SR is used for picture display of the subject performed by the display DP.

Figure 10:
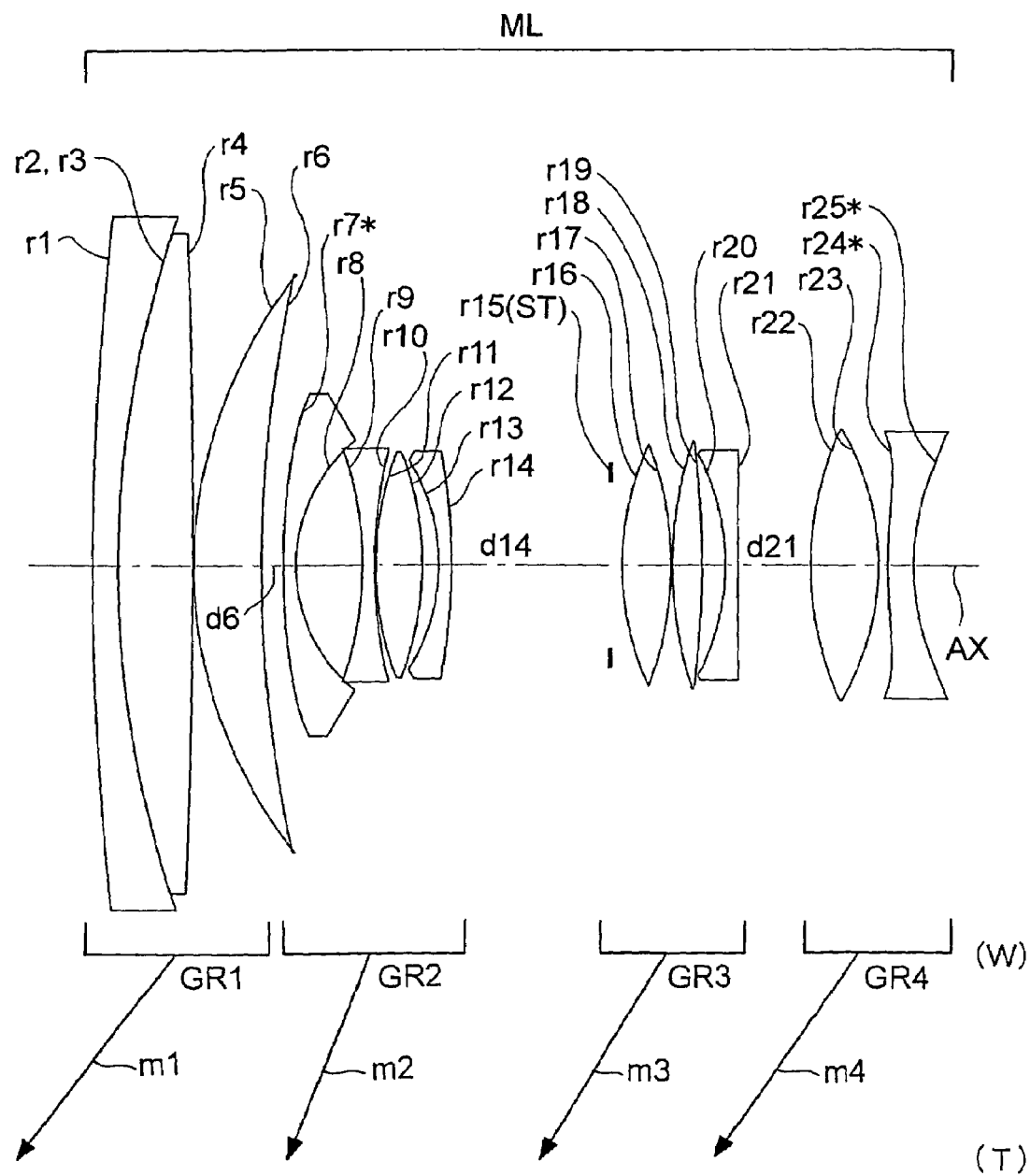
FIG. 10 is a diagram showing the lens construction of a main lens system used in common in the embodiments (Examples 1 to 4)
Figure 11A:
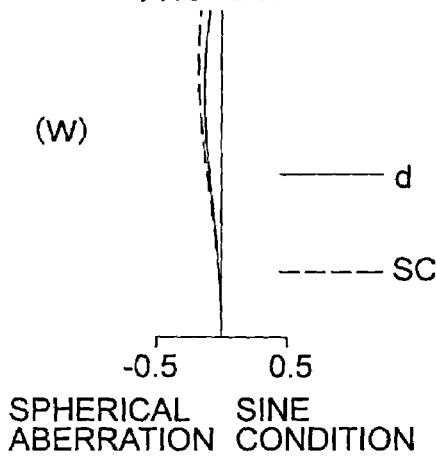
FIG. 11A to 11I are aberration diagrams of the main lens system alone.
Figure 11B:
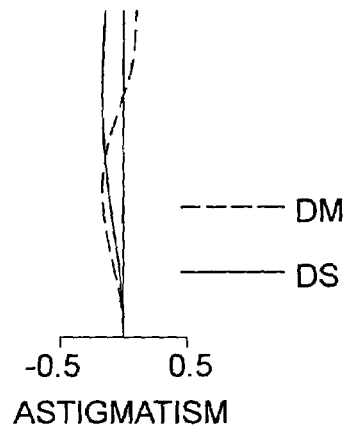
Figure 11C:
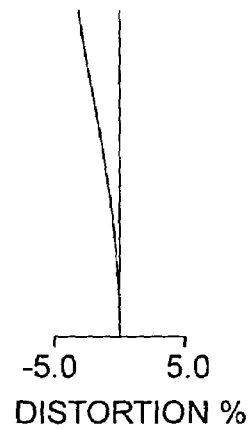
Figure 11D:
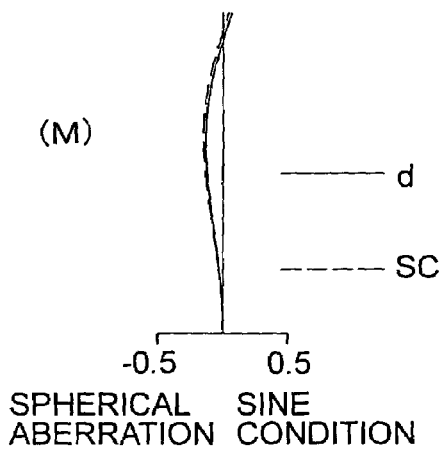
Figure 11E:
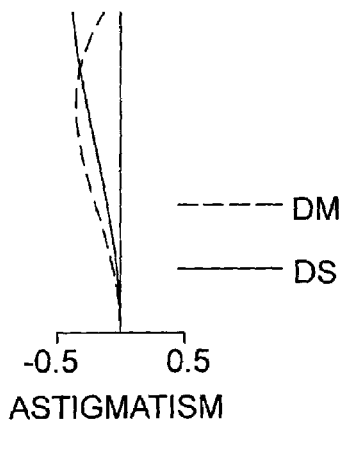
Figure 11F:
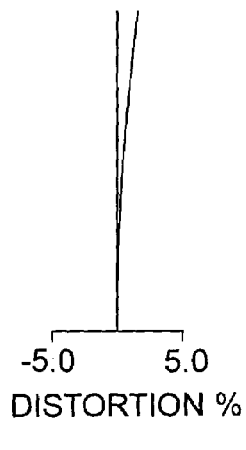
Figure 11G:
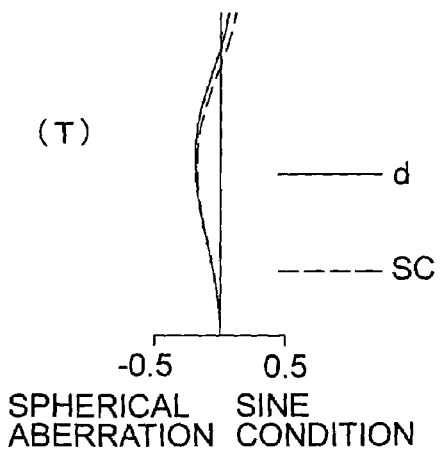
Figure 11H:
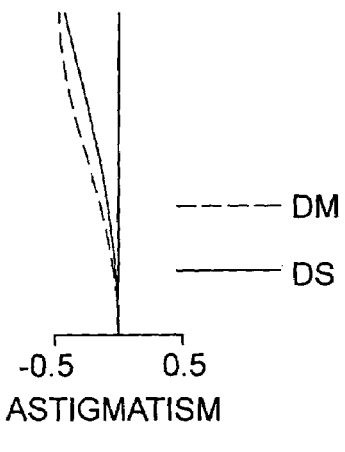
Figure 11I:
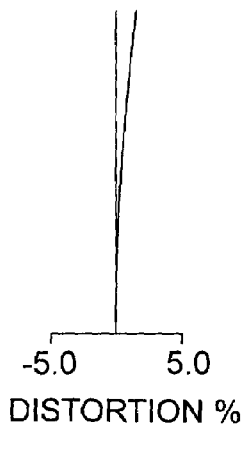

FIGS. 1 to 4 are lens construction diagrams respectively corresponding to the zoom lens systems ZL used in the first to fourth embodiments, each showing the lens arrangement as observed at the wide-angle end W in an optical section. FIG. 10 is a lens construction diagram corresponding to the main lens system ML alone that is used in common in the first to fourth embodiments, showing the lens arrangement as observed at the wide-angle end W in an optical section. In each of the lens construction diagrams, the following conventions are used. A surface indicated by ri (i=1, 2, 3, . . .) is the i-th surface counted from the object side, and a surface whose symbol ri is marked with an asterisk (*) is an aspherical surface. An axial distance indicated by di (i=1, 2, 3, . . .) is the i-th axial distance counted from the object side, though only those axial distances which vary during zooming are shown here. In each of the lens construction diagrams, arrows m1, m2, m3, and m4 represent movement loci that schematically indicate the movement of the first to fourth lens units GR1 to GR4, respectively, during zooming from the wide-angle end W to the telephoto end T. The arrow shown on the most image side indicates that the fifth lens unit GR5 and a plane-parallel plate PT (equivalent to an optical filter such as an optical low-pass filter, an infrared cut filter, or the like provided as necessary, and also to the cover glass of the image sensor SR or the like) are fixed in position during zooming. The image sensor SR is 4/3 type-compatible.

The zoom lens systems ZL of the first to fourth embodiments (FIGS. 1 to 4) are each composed of, from the object side: a first lens unit GR1 having a positive optical power (an optical power is a quantity defined by the reciprocal of a focal length), a second lens unit GR2 having a negative optical power, an aperture stop ST, a third lens unit GR3 having a positive optical power, a fourth lens unit GR4 having a positive optical power, and a fifth lens unit GR5 having a positive optical power. This zoom lens system ZL has a five-unit zoom construction that achieves zooming by varying intervals between lens units. This zoom lens system ZL is composed of the main lens system ML and the reduction optical system SL, as described above. The reduction optical system SL forms, without re-imaging, a reduced image of a subject image formed by the main lens system ML. In any of the embodiments, the same structure is applied to the main lens system ML. The aperture stop ST arranged between the second lens unit GR2 and the third lens unit GR3 moves together with the third lens unit GR3 during zooming (arrow m3).

The main lens system ML (FIG. 10) used in the first to fourth embodiments (FIGS. 1 to 4), as a zoom lens system having a four-unit zoom construction composed of the first to fourth lens units GR1 to GR4 as a positive, a negative, a positive, and a positive unit, has alone satisfactory optical performance. This main lens system ML is also so configured as to be easily fitted in an interchangeable manner as the interchangeable lens CL for the camera CU. On the other hand, the reduction optical system SL is fixedly fitted, as the last unit of the zoom lens system ZL, the fifth lens unit GR5 having a positive optical power, in the camera body CB. The lens construction of each of the embodiments will be described in detail below.

The lens units of the main lens system ML in the first to fourth embodiments (FIG. 1 to 4) are constructed as follows. The first lens unit GR1 is composed of, from the object side: a cemented lens element formed of a negative meniscus lens element concave to the image side and a biconvex positive lens element; and a positive meniscus lens element convex to the object side. The second lens unit GR2 is composed of, from the object side: a negative meniscus lens element concave to the image side and having an aspherical surface on the object side; a biconcave negative lens element; a biconvex positive lens element; and a negative meniscus lens element concave to the object side. The third lens unit GR3 is composed of, from the object side: two biconvex positive lens elements; and a biconcave negative lens element. To the object side of the third lens unit GR3, the aperture stop ST is arranged which moves together with the third lens unit GR3 during zooming. The fourth lens unit GR4 is composed of, from the object side: a biconvex positive lens element; and a negative meniscus lens element concave to the image side and having aspherical surfaces on both sides.

In the first to fourth embodiments (FIGS. 1 to 4), the reduction optical system SL composing the fifth lens unit GR5 is constructed as follows. In the first embodiment (FIG.

1), the reduction optical system SL is composed of, from the object side: a negative meniscus single-lens element LA convex to the object side; and a cemented lens element LB composed of a biconvex positive lens element and a biconcave negative lens element. In the second embodiments (FIG. 2), the reduction optical system SL is composed of, from the object side: a negative meniscus single-lens element LA convex to the object side; a cemented lens element LB composed of a positive meniscus lens convex to the object side and a negative meniscus lens element concave to the image side; and a positive meniscus lens element convex to the object side. In the third embodiment (FIG. 3), the reduction optical system SL is composed of, from the object side, a negative meniscus single-lens element LA convex to the object side; a cemented lens element LB composed of a biconvex positive lens element and a biconcave negative lens element; and a positive meniscus lens element convex to the object side and having an aspherical surface on the image side. In the fourth embodiment (FIG. 4), the reduction optical system SL is composed of, from the object side: a positive meniscus single-lens element LA convex to the object side; a cemented lens element LB composed of a negative meniscus lens element concave to the image side and a positive meniscus lens element convex to the object side; and a positive meniscus lens element convex to the object side and having an aspherical surface on the image side.

In any of the embodiments, the reduction optical system SL has on the most object side the meniscus single-lens element LA convex to the object side. It is effective to arrange a relatively thick meniscus lens element (or lens bock) convex to the object side to reduce the ray height in the reduction optical system. Arranging this meniscus lens element on the most object side permits efficient correction of aberration (correction of curvature of field in particular) as well as a compact construction of the reduction optical system as a whole. Arranging on the most object side the cemented lens element makes it difficult to correct both longitudinal chromatic aberration and lateral chromatic aberration; therefore, the lateral chromatic aberration in particular can be more efficiently corrected by a lens element arranged on the image side. Thus, it is desirable that the cemented lens element be arranged at the second (or more) position counted from the object side. Since the lens element located on the most object side has the largest diameter, providing a single-lens element as the lens element located on the most object side permits weight saving of the reduction optical system and also provides cost benefit. Therefore, it is preferable that a meniscus single-lens element convex to the object side be arranged as the lens element located on the most object side in the reduction optical system.

The construction, as described above, such that the reduction optical system has the meniscus single-lens element convex to the object side on the most object side can achieve a high-performance, compact reduction optical system. When this reduction optical system is provided in an image-taking apparatus, for example, an interchangeable lens for a silver salt single-lens reflex camera can be interchangeably used for a digital camera or the like. Then, the use of this image-taking apparatus in a digital camera or a portable data device can contribute to slimming, weight saving, downsizing, cost reduction, performance enhancement, function enhancement, and the like of these devices. If, for example, the shape of the above meniscus single-lens element or the like satisfies a predetermined condition, aberration performance and the like can be further improved while maintaining a favorable balance with the downsizing, the cost reduction, and the like.

It is desirable that conditional formula (1) below be fulfilled.

$$-0.2 < (R1-R2)/(R1+R2) < 0.3 \quad (1)$$

where
R1 represents the radius of curvature of the object side surface of the meniscus single-lens element, and
R2 represents the radius of curvature of the image side surface of the meniscus single-lens element.

The role of the meniscus single-lens element is to reduce the ray height; therefore, it is desirable that the meniscus single-lens element produces as little aberration as possible. That is, it is desirable that aberration produced on the front surface (that is, object side surface) of the meniscus single-lens element be cancelled by aberration produced on the rear surface (that is, image side surface) of the meniscus single-lens element. To this end, it is desirable that the both surfaces of the meniscus-single lens element have curvatures that are close to each other. From this viewpoint, the conditional formula (1) defines a preferable conditional range for the shape factor of the meniscus single-lens element. Deviation from the conditional range of the conditional formula (1) results in greater residual aberration, which makes it difficult to correct this aberration with a different lens element.

It is further desirable that at least one of conditional formulae (1a) and (1b) below be fulfilled.

$$-0.15 < (R1-R2)/(R1+R2) < 0.2 \quad (1a)$$

$$-0.10 < (R1-R2)/(R1+R2) < 0.1 \quad (1b)$$

The conditional formulae (1a) and (1b) each define, within the conditional range defined by conditional formula (1), a conditional range further preferable out of the above-stated points and other considerations.

It is desirable that conditional formula (2) be fulfilled.

$$0.1 < tm/ts < 0.5 \quad (2)$$

where
tm represents the core thickness of the meniscus single-lens element, and
ts represents the axial thickness of the entire reduction optical system.

The conditional formula (2) defines a favorable conditional range concerning the core thickness of the meniscus single-lens element. If the lower limit of the conditional formula (2) is disregarded, the core thickness of the meniscus single-lens element becomes smaller, thus resulting in insufficient action in reducing the ray height. By contrast, if the upper limit of the conditional formula (2) is disregarded, the core thickness of the meniscus single-lens element becomes greater, thus resulting in greater action in reducing the ray height while producing curvature of field, which is difficult to be corrected.

It is further desirable that at least one of conditional formulae (2a) and (2b) below be fulfilled.

$$0.12 < tm/ts < 0.40 \quad (2a)$$

$$0.15 < tm/ts < 0.35 \quad (2b)$$

The conditional formulae (2a) and (2b) each define, within the conditional range defined by conditional formula (2), a conditional range further preferable out of the above-stated points and other considerations.

The meniscus single-lens element LA convex to the object side, which is located on the most object side in the reduction optical system SL, has a negative optical power in the first to third embodiments and a positive optical power in the fourth embodiment. To the image side of the meniscus single-lens element LA, one cemented lens element LB is arranged adjacently. In the first to third embodiments, the cemented lens element LB is composed of, from the object side, a positive lens element and a negative lens element that are cemented together. In the fourth embodiment, the cemented lens element LB is composed of, from the object side, a negative lens element and a positive lens element that are cemented together. As is the case with any of the embodiments, it is preferable that at least one cemented lens element be arranged to the image side of the aforementioned meniscus single-lens element convex to the object side. This permits achieving effective space saving and chromatic aberration correction.

It is desirable that the reduction optical system have at least one cemented lens element arranged to the image side of the aforementioned meniscus single-lens element, and that the cemented lens element fulfill conditional formula (3) below.

$$\Delta vd > 10 \quad (3)$$

where $\Delta vd$ represents the difference in the Abbe number between the lens elements composing the cemented lens element.

The conditional formula (3) defines a favorable conditional range concerning the chromatic aberration correction capability of the cemented lens element arranged to the image side of the meniscus single-lens element. If the conditional range of this conditional formula (3) is disregarded, chromatic aberration (longitudinal chromatic aberration in particular) increases, which is difficult to be corrected appropriately.

It is further desirable that conditional formula (3a) below be fulfilled.

$$\Delta vd > 20 \quad (3a)$$

The conditional formula (3a) defines, within the conditional range defined by conditional formula (3), a conditional range further preferable out of the above-stated points and other considerations.

In the third and fourth embodiments (FIGS. 3 and 4), the lens element located on the most image side is provided with an aspherical surface. A lens element that is located near the image surface is effective in correcting curvature of field; therefore, the adoption of an aspherical surface for this lens element permits even more efficient correction of the curvature of field. Thus, it is preferable that the lens element located on the most image side in the reduction optical system has an aspherical surface.

For example, when it is assumed that an interchangeable lens for a silver salt single-lens reflex camera is applied to a digital camera, the reduction optical system needs to be configured such that the aberration performance is balanced in a predetermined range of lateral magnifications $\beta s(<1)$. From this viewpoint, it is desirable that the reduction optical system fulfill conditional formula (4) below. If the reduction optical system fulfills conditional formula (4) when forming, without re-imaging, a reduced image of an image formed by the main lens system, the performance can be even more effectively enhanced.

$$rr < 0.8 \quad (4)$$

where rr represents a reduction ratio, rr is equal to SY/LY

SY represents a half of a diagonal line length of the image sensor screen, and

LY represents a maximum image height of an image formed by the main lens system only with respect to the image sensor having a format in which the main lens system forms an image.

In each of the embodiments, the zoom lens system ZL includes refractive lens elements, that is, lens elements that deflect rays incident thereon by refraction (that is, lens elements in which light is deflected at the interface between two media having different refractive indices). Any of those lens elements, however, may be replaced with a lens element of any other type, for example: a diffractive lens element, which deflects rays incident thereon by diffraction; a refractive-diffractive hybrid lens element, which deflects rays incident thereon by the combined effect of refraction and diffraction; or a gradient index lens element, which deflects the rays incident thereon with a refractive index distribution within a medium. A gradient index lens element, however, requires that its refractive index be varied within a medium and thus requires a complicated production process. Thus, using a gradient index lens element leads to higher cost. To avoid this, it is preferable to use lens elements made of a material having a uniform refractive index distribution. The zoom lens system ZL includes, other than lens elements, the aperture stop ST as an optical element, and may further include, as necessary, a beam restricting plate (for example, a flair cutter) or the like for cutting unnecessary light.

EXAMPLES

Hereinafter, practical examples of the zoom lens system embodying the present invention will be presented with reference to their construction data and other data. Examples 1 to 4 presented below are numerical examples corresponding respectively to the first to fourth embodiments described above. Thus, the optical construction diagrams (FIGS. 1 to 4) showing the first to fourth embodiments also show the lens constructions of Examples 1 to 4, respectively.

Tables 1 to 8 show the construction data of Examples 1 to 4. Tables 9 and 10 show the construction data of the main lens system ML alone (FIG. 10) that is used in common in Examples 1 to 4. Table 11 shows the values for the conditional formulae as actually observed in each example. In the basic optical construction shown in Tables 1, 3, 5, 7, and 9 (where i represents the surface number), ri (i=1, 2, 3, . . .) represents the radius of curvature (mm) of the i-th surface counted from the object side; di (i=1, 2, 3, . . .) represents the axial distance (mm) between the i-th and (i+1)th surfaces counted from the object side; Ni (i=1, 2, 3, . . .) and vi (i=1, 2, 3, . . .) represent the refractive index (Nd) for the d-line and the Abbe number (vd), respectively, of the optical material that fills the axial distance di. For each of the variable axial distances, that is, those axial distances di that vary with zooming, three values are given, which are the values observed at the wide-angle end (at the shortest-focal-length position) W, at the middle position (at the middle-focal-length position) M, and at the telephoto end (at the longest-focal-length position) T, respectively. Shown together are the values of the focal length f (mm) of the entire system, and the f-number FNO as observed at the just mentioned different focal-length positions W, M, and T.

A surface whose radius of curvature ri is marked with an asterisk (*) is an aspherical surface (a refractive optical surface having an aspherical shape, or a surface that exerts a refractive effect equivalent to that exerted by an aspherical surface, or the like). The surface shape of an aspherical surface is defined by formula (AS) below. Tables 2, 4, 6, 8, and 10 also show the aspherical surface data of the aspherical surfaces used in Examples 1 to 4 and the main lens system ML. Here, it should be noted that the coefficient of any term that does not appear in the tables equals zero, and that, for all the data, E-n stands for "×10$^{-n}$".

$$X(H)=(C0 \cdot H^2)/(1+\sqrt{1-\epsilon \cdot C0^2 \cdot H^2})+\Sigma(Aj \cdot H^j) \quad (AS)$$

where
- X(H) represents the displacement in the direction of the optical axis AX at the height H (relative to the vertex);
- H represents the height in a direction perpendicular to the optical axis AX;
- C0 represents the paraxial curvature (=1/ri);
- ε represents the quadric surface parameter; and
- Aj represents the aspherical surface coefficient of the j-th order.

FIGS. 5A to 5I through FIGS. 8A to 8I are aberration diagrams of Examples 1 through 4, respectively, and FIG. 11A to 11I are aberration diagrams of the main lens system ML alone, when focused at infinity. Of these aberration diagrams, those with numbers suffixed with A, B, or C show the aberrations observed at (W) representing the wide angle end, those with numbers suffixed with D, E, or F show the aberrations observed at (M) representing the middle position, and those with numbers suffixed with G, H, or I show the aberrations observed at (T) representing the telephoto end. Of these aberration diagrams, those with numbers suffixed with A, D, or G show spherical aberration, those with numbers suffixed with B, E, or H show astigmatism, and those with numbers suffixed with C, F, or I show distortion. FNO represents the F number, and Y' (in mm) represents the maximum image height (corresponding to the distance from the optical axis AX) on the light-receiving surface SS of the image sensor SR. In the spherical aberration diagrams, a solid line d represents the spherical aberration (in mm) for the d-line, and a broken line SC represents the deviation (in mm) from the sine condition to be fulfilled. In the astigmatism diagrams, a broken line DM represents the astigmatism (in mm) for the d-line on the meridional surface, and a solid line DS represents the astigmatism (in mm) for the d-line on the sagittal surface. In the distortion diagrams, a solid line represents the distortion (in %) with respect to the d-line.

The main lens system ML used in common in the embodiments is compliant with a 135 system (35-mm film format, with a full-size maximum image height of 21.5 mm) at focal lengths of 24 to 105 mm. The main lens system ML alone has satisfactory optical performance as a four-unit zoom lens system having a positive, a negative, a positive, and a positive unit. When an interchangeable lens for a 135 system is used for an image sensor having an image screen size of a 135 system so as to form a subject image, a peripheral area of the screen becomes dark due to shading. Known as an image sensor to avoid this shading is an image sensor which has an image screen size smaller than the image screen size of the 135 system, so-called APS-C size. With the APS-C size, the maximum image height is 14.2 mm. The aberration diagrams of FIG. 11A to 11I show optical performance for the APS-C size.

The reduction optical system in each of the embodiments forms, without re-imaging, a reduced image of an image formed by the main lens system ML, and then forms this image onto an image sensor having an image screen size smaller than the APS-C size in which the main lens system ML forms an image (if shading is acceptable, the image screen size to be reduced may be a format of the 135 system). As the small image screen size, 4/3 (four thirds system) is assumed in the embodiments. With the 4/3 format, the maximum image height is 10.8 mm (reduction ratio: 0.76). FIGS. 5A to 5I through 8A to 8I show optical performance for the 4/3 type.

The comparison between the aberrations (FIG. 11) with the main lens system ML alone and the aberrations (FIGS. 5A to 5I through 8A to 8I) in Examples 1 to 4 clearly shows improvements in the aberration characteristics achieved by the reduction optical system in each Example. In addition, the F number is smaller, thus totally achieving a bright photographing optical system (zoom lens system ZL). The improvement in the brightness of the photographing optical system can increase the shutter speed, and thus can effectively control camera shake.

Each Example shows reduction in which an image is formed in the APS-C format onto a 4/3-type image sensor. However, each example is not limited to this reduction example, but includes examples shown below and other examples:

Example in which an image is formed in a 135 full format onto a 4/3-type image sensor Example in which an image is formed in an APS-C format onto a 2/3-type image sensor Example in which an image is formed in a 645 format onto a 135-format-compliant image sensor, and Example in which an image is formed in a 66 format onto a 135-format-compliant image sensor.

TABLE 1

| Example 1 | Focal Length Position f [mm] FNO | | (W)~(M)~(T) 18.78~38.01~77.96 2.75~3.31~4.75 | | |
| --- | --- | --- | --- | --- | --- |
| i | ri [mm] | di [mm] | Ni | vi | Symbol |
| 1 | 249.528 | 2.000 | 1.83350 | 21.00 | GR1 ML ZL |
| 2 | 84.301 | 0.010 | 1.51400 | 42.83 | (+) |
| 3 | 84.301 | 5.800 | 1.61800 | 63.39 | |
| 4 | −730.183 | 0.100 | | | |
| 5 | 36.621 | 5.300 | 1.69680 | 56.47 | |
| 6 | 107.289 | 1.719~14.295~22.456 | | | |
| 7 | 64.416 * | 0.950 | 1.85000 | 40.04 | GR2 |
| 8 | 13.085 | 5.115 | | | (−) |
| 9 | −28.691 | 0.950 | 1.77250 | 49.77 | |
| 10 | 40.006 | 0.100 | | | |
| 11 | 25.888 | 3.526 | 1.75000 | 25.14 | |
| 12 | −25.764 | 1.291 | | | |
| 13 | −15.956 | 0.950 | 1.75450 | 51.57 | |
| 14 | −54.247 | 12.303~5.896~0.800 | | | |
| 15 | ∞ | 0.900 | | | ST |
| 16 | 23.710 | 3.752 | 1.51823 | 58.96 | GR3 |
| 17 | −27.162 | 0.100 | | | (+) |
| 18 | 32.684 | 2.258 | 1.51823 | 58.96 | |
| 19 | −78.545 | 1.800 | | | |
| 20 | −19.487 | 0.950 | 1.75520 | 27.51 | |
| 21 | 2373.831 | 5.535~2.242~0.900 | | | |
| 22 | 26.771 | 5.300 | 1.51680 | 64.20 | GR4 |
| 23 | −21.298 | 0.741 | | | (+) |
| 24 | 49.483 * | 1.906 | 1.77450 | 44.46 | |
| 25 | 19.178 * | 1.503~15.272~38.417 | | | |
| 26 | 24.940 | 7.753 | 1.84666 | 23.78 | GR5 SL |
| 27 | 20.759 | 5.011 | | | (+) |
| 28 | 73.271 | 6.178 | 1.77250 | 49.62 | |
| 29 | −26.913 | 0.010 | 1.51400 | 42.83 | |
| 30 | −26.913 | 4.017 | 1.80518 | 25.46 | |
| 31 | 764.889 | 3.000 | | | |
| 32 | ∞ | 3.200 | 1.51680 | 64.20 | PT |
| 33 | ∞ | | | | |

TABLE 2

| Example 1 | Aspherical Surface Data of Surface i (*) | | |
|---|---|---|---|
| | Surface 7 | Surface 24 | Surface 25 |
| ε | 1.0000 | 1.0000 | 1.0000 |
| A4 | 0.99973910E−05 | −0.66535205E−04 | −0.19933886E−04 |
| A6 | −0.94151286E−07 | −0.30028464E−06 | −0.75128003E−07 |
| A8 | 0.15226578E−08 | −0.38681142E−09 | −0.26300084E−08 |
| A10 | −0.88522992E−11 | −0.17886777E−10 | 0.59431474E−11 |
| A12 | 0.24101655E−13 | 0.10706239E−12 | 0.45458882E−13 |

TABLE 3

| Example 2 | Focal Length Position f [mm] FNO | | (W)~(M)~(T) 18.78~38.01~77.96 2.75~3.31~4.75 | | | |
|---|---|---|---|---|---|---|
| i | ri [mm] | di [mm] | Ni | νi | Symbol | |
| 1 | 249.528 | 2.000 | 1.83350 | 21.00 | GR1 ML ZL | |
| 2 | 84.301 | 0.010 | 1.51400 | 42.83 | (+) | |
| 3 | 84.301 | 5.800 | 1.61800 | 63.39 | | |
| 4 | −730.183 | 0.100 | | | | |
| 5 | 36.621 | 5.300 | 1.69680 | 56.47 | | |
| 6 | 107.289 | 1.719~14.295~22.456 | | | | |
| 7 | 64.416 * | 0.950 | 1.85000 | 40.04 | GR2 | |
| 8 | 13.085 | 5.115 | | | (−) | |
| 9 | −28.691 | 0.950 | 1.77250 | 49.77 | | |
| 10 | 40.006 | 0.100 | | | | |
| 11 | 25.888 | 3.526 | 1.75000 | 25.14 | | |
| 12 | −25.764 | 1.291 | | | | |
| 13 | −15.956 | 0.950 | 1.75450 | 51.57 | | |
| 14 | −54.247 | 12.303~5.896~0.800 | | | | |
| 15 | ∞ | 0.900 | | | ST | |
| 16 | 23.710 | 3.752 | 1.51823 | 58.96 | GR3 | |
| 17 | −27.162 | 0.100 | | | (+) | |
| 18 | 32.684 | 2.258 | 1.51823 | 58.96 | | |
| 19 | −78.545 | 1.800 | | | | |
| 20 | −19.487 | 0.950 | 1.75520 | 27.51 | | |
| 21 | 2373.831 | 5.535~2.242~0.900 | | | | |
| 22 | 26.771 | 5.300 | 1.51680 | 64.20 | GR4 | |
| 23 | −21.298 | 0.741 | | | (+) | |
| 24 | 49.483 * | 1.906 | 1.77450 | 44.46 | | |
| 25 | 19.178 * | 1.503~15.272~38.417 | | | | |
| 26 | 27.714 | 9.000 | 1.84666 | 23.78 | GR5 SL | |
| 27 | 23.779 | 2.220 | | | (+) | |
| 28 | 37.831 | 3.615 | 1.80420 | 46.50 | | |
| 29 | 41.780 | 0.010 | 1.51400 | 42.83 | | |
| 30 | 41.780 | 1.849 | 1.84666 | 23.78 | | |
| 31 | 19.367 | 0.764 | | | | |
| 32 | 19.381 | 9.000 | 1.48749 | 70.44 | | |
| 33 | 198.272 | 1.714 | | | | |
| 34 | ∞ | 3.200 | 1.51680 | 64.20 | PT | |
| 35 | ∞ | | | | | |

TABLE 4

| Example 2 | Aspherical Surface Data of Surface i (*) | | |
|---|---|---|---|
| | Surface 7 | Surface 24 | Surface 25 |
| ε | 1.0000 | 1.0000 | 1.0000 |
| A4 | 0.99973910E−05 | −0.66535205E−04 | −0.19933886E−04 |
| A6 | −0.94151286E−07 | −0.30028464E−06 | −0.75128003E−07 |
| A8 | 0.15226578E−08 | −0.38681142E−09 | −0.26300084E−08 |
| A10 | −0.88522992E−11 | −0.17886777E−10 | 0.59431474E−11 |
| A12 | 0.24101655E−13 | 0.10706239E−12 | 0.45458882E−13 |

TABLE 5

| Example 3 | Focal Length Position f [mm] FNO | | (W)~(M)~(T) 18.78~38.01~77.96 2.75~3.31~4.75 | | | |
|---|---|---|---|---|---|---|
| i | ri [mm] | di [mm] | Ni | νi | Symbol | |
| 1 | 249.528 | 2.000 | 1.83350 | 21.00 | GR1 ML ZL | |
| 2 | 84.301 | 0.010 | 1.51400 | 42.83 | (+) | |
| 3 | 84.301 | 5.800 | 1.61800 | 63.39 | | |
| 4 | −730.183 | 0.100 | | | | |
| 5 | 36.621 | 5.300 | 1.69680 | 56.47 | | |
| 6 | 107.289 | 1.719~14.295~22.456 | | | | |
| 7 | 64.416 * | 0.950 | 1.85000 | 40.04 | GR2 | |
| 8 | 13.085 | 5.115 | | | (−) | |
| 9 | −28.691 | 0.950 | 1.77250 | 49.77 | | |
| 10 | 40.006 | 0.100 | | | | |
| 11 | 25.888 | 3.526 | 1.75000 | 25.14 | | |
| 12 | −25.764 | 1.291 | | | | |
| 13 | −15.956 | 0.950 | 1.75450 | 51.57 | | |
| 14 | −54.247 | 12.303~5.896~0.800 | | | | |
| 15 | ∞ | 0.900 | | | ST | |
| 16 | 23.710 | 3.752 | 1.51823 | 58.96 | GR3 | |
| 17 | −27.162 | 0.100 | | | (+) | |
| 18 | 32.684 | 2.258 | 1.51823 | 58.96 | | |
| 19 | −78.545 | 1.800 | | | | |
| 20 | −19.487 | 0.950 | 1.75520 | 27.51 | | |
| 21 | 2373.831 | 5.535~2.242~0.900 | | | | |
| 22 | 26.771 | 5.300 | 1.51680 | 64.20 | GR4 | |
| 23 | −21.298 | 0.741 | | | (+) | |
| 24 | 49.483 * | 1.906 | 1.77450 | 44.46 | | |
| 25 | 19.178 * | 1.503~15.272~38.417 | | | | |
| 26 | 23.807 | 4.155 | 1.80610 | 40.72 | GR5 SL | |
| 27 | 23.647 | 9.266 | | | (+) | |
| 28 | 66.835 | 5.517 | 1.80420 | 46.50 | | |
| 29 | −32.742 | 0.010 | 1.51400 | 42.83 | | |
| 30 | −32.742 | 1.000 | 1.67270 | 32.17 | | |
| 31 | 29.506 | 1.002 | | | | |
| 32 | 26.961 | 2.644 | 1.72000 | 50.31 | | |
| 33 | 46.990 * | 2.848 | | | | |
| 34 | ∞ | 3.200 | 1.51680 | 64.20 | PT | |
| 35 | ∞ | | | | | |

TABLE 6

| Example 3 | Aspherical Surface Data of Surface i (*) | | |
|---|---|---|---|
| | Surface 7 | Surface 24 | Surface 25 |
| ε | 1.0000 | 1.0000 | 1.0000 |
| A4 | 0.99973910E−05 | −0.66535205E−04 | −0.19933886E−04 |
| A6 | −0.94151286E−07 | −0.30028464E−06 | −0.75128003E−07 |
| A8 | 0.15226578E−08 | −0.38681142E−09 | −0.26300084E−08 |
| A10 | −0.88522992E−11 | −0.17886777E−10 | 0.59431474E−11 |
| A12 | 0.24101655E−13 | 0.10706239E−12 | 0.45458882E−13 |
| | Surface 33 | | |
| ε | 1.0000 | | |
| A4 | 0.67727801E−05 | | |
| A6 | −0.20308270E−09 | | |
| A8 | 0.21577855E−09 | | |

TABLE 7

| | Example 4 | | Focal Length Position f [mm] FNO | | (W)~(M)~(T) 18.78~38.01~77.96 2.75~3.31~4.75 | | |
|---|---|---|---|---|---|---|---|
| i | ri [mm] | di [mm] | | Ni | vi | Symbol | |
| 1 | 249.528 | 2.000 | | 1.83350 | 21.00 | GR1 | ML  ZL |
| 2 | 84.301 | 0.010 | | 1.51400 | 42.83 | (+) | |
| 3 | 84.301 | 5.800 | | 1.61800 | 63.39 | | |
| 4 | −730.183 | 0.100 | | | | | |
| 5 | 36.621 | 5.300 | | 1.69680 | 56.47 | | |
| 6 | 107.289 | 1.719~14.295~22.456 | | | | | |
| 7 | 64.416 | * | 0.950 | 1.85000 | 40.04 | GR2 | |
| 8 | 13.085 | 5.115 | | | | (−) | |
| 9 | −28.691 | 0.950 | | 1.77250 | 49.77 | | |
| 10 | 40.006 | 0.100 | | | | | |
| 11 | 25.888 | 3.526 | | 1.75000 | 25.14 | | |
| 12 | −25.764 | 1.291 | | | | | |
| 13 | −15.956 | 0.950 | | 1.75450 | 51.57 | | |
| 14 | −54.247 | 12.303~5.896~0.800 | | | | | |
| 15 | ∞ | 0.900 | | | | ST | |
| 16 | 23.710 | 3.752 | | 1.51823 | 58.96 | GR3 | |
| 17 | −27.162 | 0.100 | | | | (+) | |
| 18 | 32.684 | 2.258 | | 1.51823 | 58.96 | | |
| 19 | −78.545 | 1.800 | | | | | |
| 20 | −19.487 | 0.950 | | 1.75520 | 27.51 | | |
| 21 | 2373.831 | 5.535~2.242~0.900 | | | | | |
| 22 | 26.771 | 5.300 | | 1.51680 | 64.20 | GR4 | |
| 23 | −21.298 | 0.741 | | | | (+) | |
| 24 | 49.483 | * | 1.906 | 1.77450 | 44.46 | | |
| 25 | 19.178 | * | 1.503~15.272~38.417 | | | | |
| 26 | 25.497 | 3.122 | | 1.84666 | 23.78 | GR5 | SL |
| 27 | 31.844 | 1.483 | | | | (+) | |
| 28 | 35.222 | 5.517 | | 1.80518 | 25.46 | | |
| 29 | 15.593 | 0.010 | | 1.51400 | 42.83 | | |
| 30 | 15.593 | 3.626 | | 1.48749 | 70.44 | | |
| 31 | 21.284 | 1.955 | | | | | |
| 32 | 30.888 | 9.939 | | 1.48749 | 70.44 | | |
| 33 | 106.732 | * | 1.651 | | | | |
| 34 | ∞ | 3.200 | | 1.51680 | 64.20 | PT | |
| 35 | ∞ | | | | | | |

TABLE 8

| Example 4 | Aspherical Surface Data of Surface i (*) | | |
|---|---|---|---|
| | Surface 7 | Surface 24 | Surface 25 |
| ε | 1.0000 | 1.0000 | 1.0000 |
| A4 | 0.99973910E−05 | −0.66535205E−04 | −0.19933886E−04 |
| A6 | −0.94151286E−07 | −0.30028464E−06 | −0.75128003E−07 |
| A8 | 0.15226578E−08 | −0.38681142E−09 | −0.26300084E−08 |
| A10 | −0.88522992E−11 | −0.17886777E−10 | 0.59431474E−11 |
| A12 | 0.24101655E−13 | 0.10706239E−12 | 0.45458882E−13 |
| | Surface 33 | | |
| ε | 1.0000 | | |
| A4 | −0.44927397E−05 | | |
| A6 | −0.58238101E−07 | | |
| A8 | 0.21826259E−09 | | |

TABLE 9

| | Main Lens System ML (Common to All Examples) | | Focal Length Position f [mm] FNO | (W)~(M)~(T) 24.71~50.01~102.58 3.62~4.36~6.25 | | |
|---|---|---|---|---|---|---|
| i | ri [mm] | di [mm] | | Ni | vi | Symbol |
| 1 | 249.528 | 2.000 | | 1.83350 | 21.00 | GR1 |
| 2 | 84.301 | 0.010 | | 1.51400 | 42.83 | (+) |
| 3 | 84.301 | 5.800 | | 1.61800 | 63.39 | |
| 4 | −730.183 | 0.100 | | | | |
| 5 | 36.621 | 5.300 | | 1.69680 | 56.47 | |
| 6 | 107.289 | 1.719~14.295~22.456 | | | | |
| 7 | 64.416 | * | 0.950 | 1.85000 | 40.04 | GR2 |
| 8 | 13.085 | 5.115 | | | | (−) |
| 9 | −28.691 | 0.950 | | 1.77250 | 49.77 | |
| 10 | 40.006 | 0.100 | | | | |
| 11 | 25.888 | 3.526 | | 1.75000 | 25.14 | |
| 12 | −25.764 | 1.291 | | | | |
| 13 | −15.956 | 0.950 | | 1.75450 | 51.57 | |
| 14 | −54.247 | 12.303~5.896~0.800 | | | | |
| 15 | ∞ | 0.900 | | | | ST |
| 16 | 23.710 | 3.752 | | 1.51823 | 58.96 | GR3 |
| 17 | −27.162 | 0.100 | | | | (+) |
| 18 | 32.684 | 2.258 | | 1.51823 | 58.96 | |
| 19 | −78.545 | 1.800 | | | | |
| 20 | −19.487 | 0.950 | | 1.75520 | 27.51 | |
| 21 | 2373.831 | 5.535~2.242~0.900 | | | | |
| 22 | 26.771 | 5.300 | | 1.51680 | 64.20 | GR4 |
| 23 | −21.298 | 0.741 | | | | (+) |
| 24 | 49.483 | * | 1.906 | 1.77450 | 44.46 | |
| 25 | 19.178 | * | | | | |

TABLE 10

| Main Lens System ML | Aspherical Surface Data of Surface i (*) | | |
|---|---|---|---|
| | Surface 7 | Surface 24 | Surface 25 |
| ε | 1.0000 | 1.0000 | 1.0000 |
| A4 | 0.99973910E−05 | −0.66535205E−04 | −0.19933886E−04 |
| A6 | −0.94151286E−07 | −0.30028464E−06 | −0.75128003E−07 |
| A8 | 0.15226578E−08 | −0.38681142E−09 | −0.26300084E−08 |
| A10 | −0.88522992E−11 | −0.17886777E−10 | 0.59431474E−11 |
| A12 | 0.24101655E−13 | 0.10706239E−12 | 0.45458882E−13 |

TABLE 11

| Conditional Formula Values | (1)(1a)(1b) (R1 − R2)/(R1 + R2) | (2)(2a)(2b) tm/ts | (3)(3a) Δvd | (4) rr |
|---|---|---|---|---|
| Example 1 | 0.0915 | 0.3375 | 24.2 | 0.76 |
| Example 2 | 0.1047 | 0.3402 | 22.7 | 0.76 |
| Example 3 | 0.0013 | 0.1761 | 14.3 | 0.76 |
| Example 4 | −0.1110 | 0.1217 | 45.0 | 0.76 |

What is claimed is:

1. A reduction optical system for forming, without re-imaging, a reduced image of a subject image formed by a main lens system,
   wherein a meniscus single-lens element convex to an object side is provided on a most object side, and
   wherein the meniscus single-lens element fulfills conditional formula (1) below:

$$-0.2 < (R1-R2)/(R1+R2) < 0.3 \quad (1)$$

where R1 represents a radius of curvature of an object side surface of the meniscus single-lens element, and R2 represents a radius of curvature of an image side surface of the meniscus single-lens element, and wherein the meniscus single-lens element fulfills conditional formula (2) below:

$$0.1 < tm/ts < 0.5 \tag{2}$$

where tm represents a core thickness of the meniscus single-lens element, and ts represents an axial thickness of the entire reduction optical system.

2. The reduction optical system according to claim 1, wherein a lens element located on a most image side has an aspherical surface.

3. The reduction optical system according to claim 1, wherein the meniscus single-lens element has a positive optical power.

4. The reduction optical system according to claim 1, wherein the meniscus single-lens element has a negative optical power.

5. A reduction optical system for forming, without re-imaging, a reduced image of a subject image formed by a main lens system, wherein a meniscus single-lens element convex to an object side is provided on a most object side, and wherein the meniscus single-lens element fulfills conditional formula (1) below:

$$-0.2 < (R1-R2)/(R1+R2) < 0.3 \tag{1}$$

where R1 represents a radius of curvature of an object side surface of the meniscus single-lens element, and R2 represents a radius of curvature of an image side surface of the meniscus single-lens element and wherein at least one cemented lens element is provided to an image side of the meniscus single-lens element, and wherein the cemented lens element fulfills conditional formula (3) below:

$$\Delta vd > 10 \tag{3}$$

where Δvd represents a difference in an Abbe number between lens elements forming the cemented lens element.

6. The reduction optical system according to claim 5, wherein the cemented lens element is formed by cementing together a positive lens element and a negative lens element.

7. A reduction optical system for forming, without re-imaging, a reduced image of a subject image formed by a main lens system, wherein a meniscus single-lens element convex to an object side is provided on a most object side, and wherein the meniscus single-lens element fulfills conditional formula (1) below:

$$-0.2 < (R1-R2)/(R1+R2) < 0.3 \tag{1}$$

where R1 represents a radius of curvature of an object side surface of the meniscus single-lens element, and R2 represents a radius of curvature of an image side surface of the meniscus single-lens element, and wherein conditional formula (4) below is fulfilled:

$$rr < 0.8 \tag{4}$$

where rr represents a reduction ratio, rr is equal to SY/LY,

SY represents a half of a diagonal line length of an image sensor screen, and

LY represents a maximum image height of an image formed by the main lens system only with respect to an image sensor having a format in which the main lens system forms an image.

8. An image-taking apparatus, comprising a reduction optical system for forming, without re-imaging, a reduced image of a subject image formed by a main lens system, the image taking apparatus permitting attachment of the main lens system which is interchangeably fitted thereto, wherein the reduction optical system has on a most object side a meniscus single-lens element convex to an object side, and wherein the meniscus single-lens element fulfills conditional formula (1) below:

$$-0.2 < (R1-R2)/(R1+R2) < 0.3 \tag{1}$$

where R1 represents a radius of curvature of an object side surface of the meniscus single-lens element, and R2 represents a radius of curvature of an image side surface of the meniscus single-lens element, and wherein the meniscus single-lens element fulfills conditional formula (2) below:

$$0.1 < tm/ts < 0.5 \tag{2}$$

where tm represents a core thickness of the meniscus single-lens element, and ts represents an axial thickness of the entire reduction optical system.

9. The image-taking apparatus according to claim 8, wherein a lens element located on a most image side has an aspherical surface.

10. The image-taking apparatus according to claim 8, wherein the meniscus single-lens element has a positive optical power.

11. The image-taking apparatus according to claim 8, wherein the meniscus single-lens element has a negative optical power.

12. The image-taking apparatus according to claim 8, wherein conditional formula (4) below is fulfilled:

$$rr < 0.8 \tag{4}$$

where rr represents a reduction ratio, rr is equal to SY/LY

SY represents a half of a diagonal line length of an image sensor screen, and

LY represents a maximum image height of an image formed by the main lens system only with respect to an image sensor having a format in which the main lens system forms an image.

13. The image-taking apparatus according to claim 8, wherein the main lens system has four-unit construction including: from the object side, a first lens unit having a positive optical power, a second lens unit having a negative optical power, a third lens unit having a positive optical power, and a fourth lens unit having a positive optical power, and wherein the main lens system is a zoom lens system that performs zooming by varying intervals between lens units.

14. The image-taking apparatus according to claim 8, wherein the reduction optical system has a positive optical power.

15. An image-taking apparatus, comprising a reduction optical system for forming, without re-imaging, a reduced image of a subject image formed by a main lens system, the image taking apparatus permitting attachment of the main lens system which is interchangeably fined thereto, wherein the reduction optical system has on a most object side a meniscus single-lens element convex to an object side, and wherein the meniscus single-lens element fulfills conditional formula (1) below:

$$-0.2 < (R1-R2)/(R1+R2) < 0.3 \qquad (1)$$

where R1 represents a radius of curvature of an object side surface of the meniscus single-lens element, and R2 represents a radius of curvature of an image side surface of the meniscus single-lens element and wherein at least one cemented lens element is provided to an image side of the meniscus single-lens element, and wherein the cemented lens element fulfills conditional formula (3) below:

$$\Delta vd > 10 \qquad (3)$$

where $\Delta vd$ represents a difference in an Abbe number between lens elements forming the cemented lens element.

16. The image-taking apparatus according to claim 15, wherein the cemented lens element is formed by cementing together a positive lens element and a negative lens element.

\* \* \* \* \*